(12) United States Patent
Chase (10) Patent No.: US 6,389,415 B1
(45) Date of Patent: *May 14, 2002

(54) SYSTEM FOR IDENTIFYING CONNOTATIVE MEANING

(75) Inventor: Wayne O. Chase, Vancouver (CA)

(73) Assignee: Connotative Reference Corporation, Vacouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/372,377

(22) Filed: Aug. 11, 1999

(51) Int. Cl.[7] .............................. G06F 17/30; G06F 7/00
(52) U.S. Cl. .............................. 707/5; 704/10; 434/169; 434/36
(58) Field of Search ...................... 707/5; 704/1, 9–10; 434/236, 169; 345/968

(56) References Cited

U.S. PATENT DOCUMENTS

| | | | |
|---|---|---|---|
| 4,384,329 A | 5/1983 | Rosenbaum et al. | 364/300 |
| 4,712,174 A | 12/1987 | Minkler, II | 364/200 |
| 4,724,523 A | 2/1988 | Kucera | 364/419 |
| 4,914,590 A | 4/1990 | Loatman et al. | 364/419 |
| 4,931,935 A | 6/1990 | Ohira et al. | 364/419 |
| 5,153,830 A | 10/1992 | Fishet et al. | 364/4.19 |
| 5,200,893 A | 4/1993 | Ozawa et al. | 364/419 |
| 5,404,299 A | 4/1995 | Tsurubaayashi et al. | 364/419.11 |
| 5,424,945 A * | 6/1995 | Bell | 364/419.2 |
| 5,696,981 A * | 12/1997 | Shovers | 395/45 |
| 5,708,822 A | 1/1998 | Wical | 395/751 |
| 5,781,879 A * | 7/1998 | Arnold et al. | 704/9 |
| 5,794,050 A | 8/1998 | Dahlgren et al. | 395/708 |
| 5,873,056 A * | 2/1999 | Liddey et al. | 704/9 |
| 5,918,222 A * | 6/1999 | Fukui et al. | 707/1 |
| 6,006,221 A * | 12/1999 | Liddy et al. | 707/5 |
| 6,026,388 A * | 2/2000 | Liddy et al. | 707/1 |
| 6,061,675 A * | 5/2000 | Wical | 706/45 |
| 6,202,058 B1 * | 3/2001 | Rose et al. | 706/45 |

OTHER PUBLICATIONS

Osgood, Charles E.; "On the Whys and Wherefores of E, P, and A," Journal of Personality and Social Psychology, vol. 12, No. 3, pp 194–199, 1969.

Oskamp, Stuart; "Attitudes and Opinios," Prentice–HAll, Inc. pp. 34–48, 1977.

Ed. by Osgood et al.; "Language, Meaning and Culture," Praeger Publishers; Ch. 7, pp 203–234; 1990.

* cited by examiner

Primary Examiner—John Breene
Assistant Examiner—Susan Rayyan
(74) Attorney, Agent, or Firm—Steven P. Koda (57) ABSTRACT

In a distributed method of data gathering, connotative meanings of terms are selected from predefined emotional descriptors organized into a plurality of emotional categories. Respective judges select zero or one emotional descriptors from a given category and rate the term for intensity. Each term is evaluated by a plurality of judges for each emotional category. The results are processed to assure that the selected emotional descriptors were not selected by chance. Anomalous results are purged. Statistical analysis is performed to assure that the selected emotional descriptors were not selected by chance. Retained associations become part of the database for the corresponding record. There may be 0, 1 or more connotative associations for any given record. The completed data base is accessed through a computer interface to implement an electronic language reference tool.

23 Claims, 7 Drawing Sheets

SYSTEM FOR IDENTIFYING CONNOTATIVE MEANING

CROSS REFERENCE TO RELATED APPLICATIONS

This invention is related to commonly-assigned U.S. patent application Ser. No. 09/372,549 filed on the same day, of W. Chase for "System for Quantifying Intensity of Connotative Meaning;" commonly-assigned U.S. patent application Ser. No. 09/372,243 filed on the same day, of W. Chase for "Interactive Connotative Dictionary System;" commonly-assigned U.S. patent application Ser. No. 09/372,244 filed on the same day, of W. Chase for "Interactive Connotative Thesaurus System;" commonly-assigned U.S. patent application Ser. No. 09/372,737 filed on the same day, of W. Chase for "System for Connotative Analysis of Discourse." The content of all such applications are incorporated herein by reference and made a part hereof.

BACKGROUND OF THE INVENTION

This invention relates to a system for identifying connotative meanings of words and phrases, and more particularly to a system for identifying emotional connotations associated with various words and phrases.

Symbolic representation is the use of ideas, images or other symbols to stand for objects or events. In the context of human language symbolic representation is achieved using words. The facility with symbolic representation to form languages distinguishes humankind from animals. Language is an abstract, rule-governed system of arbitrary symbols that can be combined in countless ways to communicate information. All languages include a system of phonology (i.e., set of sounds), semantics (i.e., word, phrase and sentence meanings), morphology (i.e., rules for combining smallest meaningful units to form or alter words), syntax (i.e., ways in which words are organized into phrases and sentences) and pragmatics (i.e., rules governing conversation and social use of language).

The use of language enables humankind to develop advanced cognitive abilities. Cognitive development relates to the changes in a person's memory, thinking, use of language and other mental skills as they develop from infants to adults. Humans develop a certain degree of cognitive competence. In addition to such cognitive competence, humans also display and experience feelings, emotions and moods. In particular, our emotional state or the emotional state we desire to elicit can influence our choice of words. Every human language enables people to communicate both intellectually and emotionally because words and phrases convey both cognitive and affective meaning. 'Affective' means to be influenced by or result from emotions.

Linguistics is the scientific study of language. Semantics is the branch of linguistics that deals with the study of the relationship between words or phrases and their meanings. Of particular significance here are the contrasting linguistic terms, denotation and connotation. 'Denotation' is a particular meaning of a symbol. 'Connotation' is an idea or meaning suggested by or associated with a word or phrase. Thus, 'denote' describes the relation between a word or phrase and the thing it conventionally names, whereas 'connote' describes the relation between the word or phrase and the images or associations it evokes. As used herein a denotation is an objective, cognitive meaning which refers to the direct relationship between a term and the object, idea or action it designates. As used herein, a connotation is a subjective, affective meaning which refers to the emotive and associative aspect of a term.

The denotative meanings of words have been systematically codified into definitions and collected together to form dictionaries, thesauruses and related denotative language references. However, the codification of connotative meanings has not been achieved. Consider, for example, a dictionary which provides the following denotative meaning for the word 'pub': "a building providing alcoholic drinks for consumption on the premises" (Oxford Dictionary). However, the word 'pub' simultaneously conveys a host of emotional connotations, such as merriment, pleasure, cheerfulness, perhaps some sadness, and so on. Similarly, words such as 'summer', 'love', and 'melody' have a variety of positive emotional connotative associations for most people, while words such as 'cancer', 'rape', and 'homeless' have negative emotional connotations for most people. In all cases, the associated connotations are not systematically accessible using any known language reference resource or tool.

The reason for the absence of codification of connotative meaning is that, while words readily evoke emotional connotations, the converse is not true: emotional connotations are not easily codified using words. Unlike denotative meaning, affective meaning does not naturally lend itself to systematic word-symbol description. Emotions are felt, not thought, so the relationship between a word and its associated connotative content, while real, is not codifiable using the relatively straightforward methods employed by lexicographers in fashioning denotative definitions.

Accordingly, there is a need of a system for codifying the connotative meanings of words and phrases. In particular there is a need for a 'connotative meaning' language reference tool.

SUMMARY OF THE INVENTION

According to the invention, a system for identifying connotative meaning of words or phrases is implemented. A given word or phrase has its connotative meaning determined for a given denotative context. A data base is formed having multiple records. Each record corresponds to a term (i.e., word or phrase) and its denotative context. Zero, one or more connotative associations are defined for each record.

According to another aspect of the invention, each record is evaluated by a plurality of connotative judges for a connotative association within a given emotional category. There are a predefined plurality of emotional categories established for evaluating connotative associations of terms. Within each emotional category there are a plurality of emotional descriptors.

According to one embodiment of the invention, there are eight emotional categories predefined for the English language: affection/friendliness, amusement/excitement, enjoyment/elation, contentment/gratitude, sadness/grief, anger/loathing, fear/uneasiness, and humiliation/shame. A plurality of descriptors are predefined for each emotional category.

According to another aspect of the invention, each connotative judge examines the denotative context of a given word or phrase and selects an emotional descriptor which the judge associates with such word or phrase in the given denotative context. The judge is given the emotional descriptors from a single category and selects the primary emotional descriptor, or both a primary and a secondary emotional descriptor which the judge associates with the word or phrase. Alternatively, the judge may indicate that none of the descriptors are associated with the word or phrase, or that the judge is unfamiliar with the word or phrase and its denotative context. In a separate analysis the judge is given the same or a different record. When the same record is presented, the judge is given a different set of emotional descriptors from a different emotional category. Again, the judge selects the primary emotional descriptor, or both a primary and a secondary emotional descriptor which the judge associates with the word or phrase. As with the prior record, the judge may indicate that none of the descriptors are associated with the word or phrase, or that the judge is unfamiliar with the word or phrase and its denotative context.

According to another aspect of the invention, each record is evaluated by a statistically significant number of judges for each one of the emotional categories. The results are processed to evaluate which emotional descriptors are most often associated with each given record. Anomalous results are purged (e.g., when the judge fills in responses at random rather than doing the mental work solicited; when the judge codes in many alternative responses such as 'no connotative association' or 'unfamiliar with denotative context'). In a specific embodiment a statistical analysis is performed to assure that the selected emotional descriptors were not selected by chance. Where the emotional descriptor was selected enough times that the probability indicates it was not selected by chance, then the emotional descriptor is accepted as a connotative association for the word or phrase in the corresponding denotative context. Such association is retained in the database as part of the record for the word or phrase and its denotative meaning. Note that there may be 0, 1 or more connotative associations with any given record.

According to another aspect of the invention, the connotative associations are continuously updated, either at prescribed intervals or on an ongoing basis, such as through a World Wide Web site. In this way, connotative judges are able to supply data continuously, with turnover of connotative judges easily managed, and the database, particularly the connotative component, kept up to date with the changing times.

According to another aspect of the invention, a panel of judges is selected from a pool of judges to respond to a questionnaire. The questionnaire includes a plurality of records and allows selection of 0 or 1—or in some embodiments 2—emotional descriptors to be associated with any given record. The choices of emotional descriptors are limited to those in one emotional category. The same or a different panel of judges then evaluates the same plurality of records for a different emotional category. Eventually, each record is evaluated for each of the emotional categories by a desired number of connotative judges.

By practicing the above method and system of the present invention, a complete and accurate connotative language reference map and database is constructed in any language, which then can be used to construct connotative equivalents of denotative language reference resources, such as connotative dictionaries, connotative thesauruses, and connotative text analysis tools.

These and other aspects and advantages of the invention will be better understood by reference to the following detailed description taken in conjunction with the accompanying drawings.

DESCRIPTION OF SPECIFIC EMBODIMENTS

A system and method are described for identifying, codifying, storing, and retrieving the connotative meaning inherent in the words and phrases of any language. Throughout this description, a preferred embodiment and examples given should be considered as exemplars rather than limitations on the method and system of the present invention.

Figure 1:
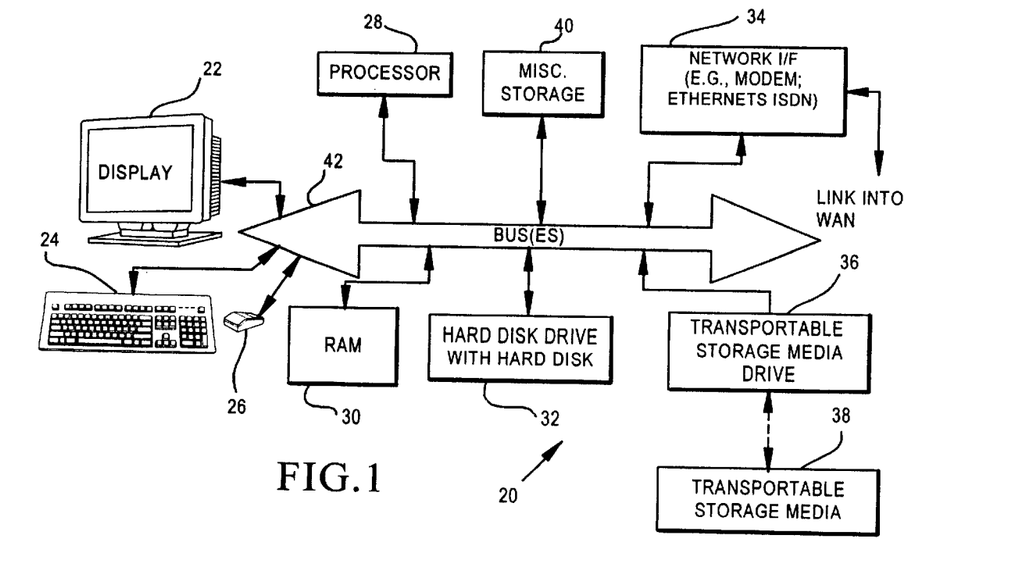
FIG. 1 is a block diagram of a host computer system.

Many of the functions of the present inventions preferably are performed by or with the assistance of a programmed digital computer of the type which is well known in the art, an example of which is shown in FIG. 1. A computer system 20 has a display 22, a key entry device 24, a pointing/clicking device 26, a processor 28, and random access memory (RAM) 30. In addition there commonly is a communication or network interface 34 (e.g., modem; ethernet adapter), a non-volatile storage device such as a hard disk drive 32 and a transportable storage media drive 36 which reads transportable storage media 38. Other miscellaneous storage devices 40, such as a floppy disk drive, CD-ROM drive, zip drive, bernoulli drive or other magnetic, optical or other storage media, may be included. The various components interface and exchange data and commands through one or more busses 42. The computer system 20 receives information by entry through the key entry device 24, pointing/clicking device 26, the network interface 34 or another input device or input port. The computer system 20 may be any of the types well known in the art, such as a mainframe computer, minicomputer, or microcomputer and may serve as a network server computer 12, remote network 16 computer or a client computer 14. The computer system 20 may even be configured as a workstation, personal computer, network server, or a reduced-feature network terminal device.

The connotative language reference serves as an interactive electronic connotative dictionary, thesaurus or other language reference. For a connotative dictionary embodiment; the connotative dictionary is distinct from a 'classic' dictionary in that it lists words with their connotative meanings. For a connotative thesaurus embodiment, the connotative thesaurus is distinct from a 'classic' thesaurus in that words are linked when they have the same or a similar emotional or related connotative meaning, but typically have a different denotative meaning. These linked words are referred to herein as "connonyms," a coined word meaning connotative synonyms. The data bases forming a computer version of the connotative language references may be formed using custom-designed database software or database software commercially available from manufacturers such as Inprise, Oracle, Microsoft or another vendor of data base software services.

Following are sections which describe a preferred embodiment of a connotative language reference and a system for identifying connotative meanings.

Connotative Language Reference

Figure 2:
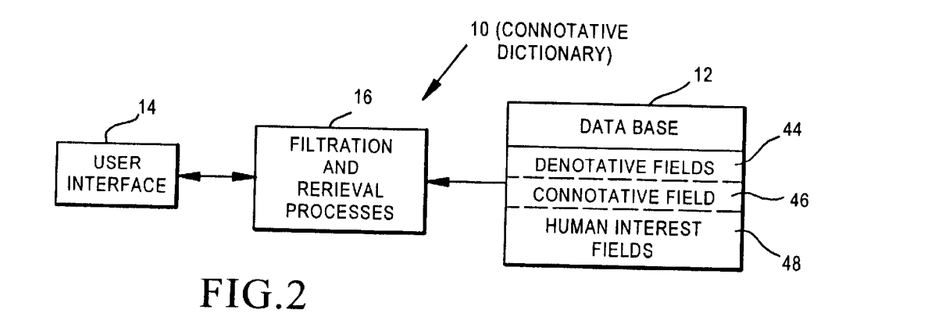
FIG. 2 is a diagram of a connotative dictionary according to an embodiment of this invention.

Referring to FIG. 2, a connotative language reference system 10 is formed by a data base 12, a user interface 14 and various filtering and retrieval processes 16. Preferably such data base 12, interface 14 and processes 16 are implemented in electronic format as one or more software programs executed on a host computer system or over a host computer network. For example, the reference system 10 may be stored on an optical disc (e.g., CD-ROM) or other storage media and installed onto a host computer system or network. Specifically, the data base 12, user interface software 14 and filtering and retrieval processes 16 may be loaded and installed locally onto the host computer system or network. In some implementations the software embodying the user interface 14 and processes 16 are installed to be resident on the host computer system or network, while the data base 12 is stored and accessed from a removable storage media, such as an optical disk. In other embodiments the data base 12 is centrally located among one or more network server computers, while the user interface software 14 and processes 16 are stored and executed from either a local end user computer system or remotely at the server computer. The implementations may vary from local copies for a given end user's access to one or more copies stored on a private network or even a global computer network which users log into to access and use the dictionary.

Data Base 12

In a preferred embodiment of the data base 12, the data base 12 includes a set of denotative fields 44, a set of connotative fields 46, and a set of human interest fields 48. The denotative fields and human interest fields are not necessary, but provide additional resources for the user. In some embodiments the data base 12 includes only the set of connotative fields 46.

The set of denotative fields 44 includes at least three fields. In one implementation the denotative data is obtained from one or more electronic or print-based dictionaries in any language. Database records are created for each word or phrase of the language, which may be the English language or any other language. In some embodiments the connotative language reference system 10 is specialized for a given subject (e.g., medical/health contexts; science). In other embodiments a general language reference is implemented for a given language. Table 1 below list three types of fields included among the denotative fields:

TABLE 1

Denotative Field Types

1. Term (i.e., Word or phrase/idiom)
2. Specific denotative context
3. Part of speech For each record in the data base 12, one denotative field is assigned to a specific term, such as a word or phrase. A second denotative field is assigned to the denotative context (dictionary meaning) of the term. A third denotative field is assigned to the part of speech of the term of field 1 when used in the context of field 2. Preferably, each context of each term is assigned a separate database record. Thus, if the dictionary definition of a single term has two meanings among a total of five contexts, then there are five records, one for each context. There may be multiple contexts for a given dictionary meaning when, for example, there are different parts of speech for the term.

Assigning an additional field to track the meanings that subsume the contexts is not necessary to practice the invention, but such a field may be assigned in an alternative embodiment. The total number of records included in the database 12 typically is equal to the sum of all of the denotative contexts of all of the terms obtained from the denotative data source or sources.

In a preferred embodiment the set of connotative fields 46 includes a block of one or more fields corresponding to each one of a plurality of emotional categories. In a best mode embodiment eight emotional categories have been identified, although the number of categories may vary to be more or less than eight. The number of fields comprising each block may vary. In one embodiment there is one field in each block that corresponds to a primary connotative emotional descriptor for the corresponding term. In some embodiments there is a field for storing a secondary connotative emotional descriptor for the corresponding term. Note that the primary and or secondary emotional descriptor can correspond to a designation of no connotative meaning stored in this emotional category for the given term.

In addition to the fields for the primary and optional secondary emotional descriptors, there also are fields associated with each block relating to the method for identifying connotative meaning. Although the method for defining connotative meaning may vary, in one embodiment the data is collected from multiple sources. In a given implementation the sources are judges or panels of judges. In some embodiments there is a field in each block for each judge's selection of the term's connotative meaning. In an example, where 24 connotative judges are used, each of the eight blocks of fields 46 includes 24 individual fields used in deriving the primary and/or secondary emotional descriptor for the term—a respective field to hold each judge's emotional descriptor data for each term in each context. Several additional fields are reserved to hold calculated data based on the connotative judges' emotional descriptor data. Fewer or more judges may be used, adjusting the number of fields within each block accordingly.

Table 2 lists eight emotional categories corresponding to the eight blocks of fields 46 for a best mode embodiment. In the exemplary embodiment the categories are classified into categories for positive emotions and categories for negative emotions. The general emotional classification "Positive Emotions" subsumes four emotional categories, and the general emotional classification "Negative Emotions" subsumes the other four emotional categories, as practiced in a preferred embodiment of the invention. Each emotional category subsumes a list of specific emotional descriptors (e.g., in this embodiment there are 12 to 37 emotional descriptors per category), each of which is associated with a two-digit identifying code number. The specific code number may vary. Further, the manner in identifying the distinct descriptors also may vary. The total number of emotional descriptors in this example is 164. In various embodiments one or more emotional descriptors may be removed from this list, entire emotional categories may be removed from the list, or one or more emotional categories and descriptors may be added to this list. In a preferred embodiment it is the code numbers which are stored in the records of the data base 12. In other embodiments the entire emotional descriptor term may be stored individually for each connotative data field of a record.

The connotative emotional descriptors that appear in Table 2 are English language emotional descriptors for one embodiment of a general connotative dictionary. The specific words that make up the emotional connotative descriptors may vary. Of course such descriptors will vary from language to language.

TABLE 2

Connotative Database Fields

POSITIVE EMOTIONS:

*Affection/Friendliness*

| | |
|---|---|
| 01 | Adoration |
| 02 | Affection |
| 03 | Amorousness |
| 04 | Devotion |
| 05 | Fondness |
| 06 | Friendliness |
| 07 | Infatuation |
| 08 | Kindliness |
| 09 | Liking |
| 10 | Love |
| 11 | Lust |
| 12 | Passion |
| 13 | Tenderness |
| 14 | Trust |
| 15 | Warmth |

*Amusement/Excitement*

| | |
|---|---|
| 01 | Amazement |
| 02 | Amusement |
| 03 | Astonishment |
| 04 | Eagerness |
| 05 | Enthusiasm |
| 06 | Excitement |
| 07 | Exhilaration |
| 08 | Exuberance |
| 09 | Fun |
| 10 | Glee |
| 11 | Hilarity |
| 12 | Merriment |
| 13 | Mirth |
| 14 | Surprise |
| 15 | Thrill |
| 16 | Wonder |

*Enjoyment/Elation*

| | |
|---|---|
| 01 | Admiration |
| 02 | Bliss |
| 03 | Cheer |
| 04 | Delight |
| 05 | Ecstasy |
| 06 | Elation |
| 07 | Enjoyment |
| 08 | Euphoria |
| 09 | Exultation |
| 10 | Happiness |
| 11 | Joy |
| 12 | Jubilation |
| 13 | Pleasure |
| 14 | Pride |
| 15 | Rapture |

*Contentment/Gratitude*

| | |
|---|---|
| 01 | Appreciation |
| 02 | Comfort |
| 03 | Contentment |
| 04 | Gladness |
| 05 | Gratitude |
| 06 | Hope |
| 07 | Peacefulness |
| 08 | Relief |
| 09 | Satisfaction |
| 10 | Serenity |
| 11 | Thankfulness |
| 12 | Well-being |

NEGATIVE EMOTIONS

*Sadness/Grief*

| | |
|---|---|
| 01 | Affliction |
| 02 | Agony |
| 03 | Anguish |
| 04 | Dejection |

TABLE 2-continued

Connotative Database Fields

| | |
|---|---|
| 05 | Demoralization |
| 06 | Depression |
| 07 | Desolation |
| 08 | Despair |
| 09 | Despondency |
| 10 | Disappointment |
| 11 | Discouragement |
| 12 | Disheartenment |
| 13 | Disillusionment |
| 14 | Dismay |
| 15 | Distress |
| 16 | Downheartedness |
| 17 | Forlornness |
| 18 | Gloom |
| 19 | Grief |
| 20 | Heartache |
| 21 | Heartbreak |
| 22 | Heartsickness |
| 23 | Hopelessness |
| 24 | Hurt |
| 25 | Longing |
| 26 | Melancholy |
| 27 | Misery |
| 28 | Pain |
| 29 | Pity |
| 30 | Sadness |
| 31 | Sorrow |
| 32 | Suffering |
| 33 | Torment |
| 34 | Unhappiness |
| 35 | Wretchedness |
| 36 | Yearning |

*Fear/Uneasiness*

| | |
|---|---|
| 01 | Alarm |
| 02 | Anxiety |
| 03 | Apprehension |
| 04 | Desperation |
| 05 | Distress |
| 06 | Dread |
| 07 | Fear |
| 08 | Horror |
| 09 | Nervousness |
| 10 | Panic |
| 11 | Paranoia |
| 12 | Stress |
| 13 | Tension |
| 14 | Terror |
| 15 | Uneasiness |
| 16 | Worry |

*Anger/Loathing*

| | |
|---|---|
| 01 | Abhorrence |
| 02 | Acrimony |
| 03 | Aggravation |
| 04 | Anger |
| 05 | Animosity |
| 06 | Annoyance |
| 07 | Antagonism |
| 08 | Antipathy |
| 09 | Aversion |
| 10 | Bitterness |
| 11 | Contempt |
| 12 | Creepiness |
| 13 | Detestation |
| 14 | Dissatisfaction |
| 15 | Disdain |
| 16 | Disgust |
| 17 | Dislike |
| 18 | Enmity |
| 19 | Envy |
| 20 | Exasperation |
| 21 | Frustration |
| 22 | Fury |
| 23 | Hatred |
| 24 | Hostility |
| 25 | Irritation |

TABLE 2-continued

Connotative Database Fields

| | |
|---|---|
| 26 | Indignation |
| 27 | Ire |
| 28 | Jealousy |
| 29 | Loathing |
| 30 | Offense |
| 31 | Outrage |
| 32 | Rage |
| 33 | Rancor |
| 34 | Resentment |
| 35 | Vexation |
| 36 | Virulence |
| 37 | Wrath |
| Humiliation/Shame | |
| 01 | Chagrin |
| 02 | Contrition |
| 03 | Degradation |
| 04 | Discredit |
| 05 | Disgrace |
| 06 | Dishonor |
| 07 | Disrepute |
| 08 | Disrespect |
| 09 | Embarrassment |
| 10 | Guilt |
| 11 | Humiliation |
| 12 | Indignity |
| 13 | Mortification |
| 14 | Regret |
| 15 | Remorse |
| 16 | Shame |
| 17 | Stigma |

In a preferred embodiment each record also includes a plurality of human interest fields 48 which each relate the corresponding term and its denotative context to a human interest category. The purpose of incorporating the human interest fields is to permit the end user to easily retrieve special connotative content from the database by first selecting one or more human interest filters before querying the database. The human interest fields 48 employed in an exemplary embodiment of the invention are listed in Table 3. There are nine groupings of the human interest categories in such embodiment. Each record includes a set of nine human interest fields—one field for each human interest category. Each field stores a human interest descriptor word. Of course, the field also may store a designation that there is no human interest context for the term as used in the associated denotative context of a given record. The human interest categories and descriptors may vary from embodiment to embodiment.

TABLE 3

SET 3: Human Interest Database Fields

Non-emotional Connotations

Power
Activity

Rhythm

Number of Syllables
Accented Syllable

Special Diction

Question-starting Words
Core Words Identified by S. I. Hayakawa

Personal Identity

Gender
First Names (Baby Names)

TABLE 3-continued

SET 3: Human Interest Database Fields

Notorious Or Celebrated People
Languages
National Identity
Organizations of Note
Home
Personal Relationships
Intimacy Spiritual Identity Biblical Diction
Christianity
Judaism
Islam
Hinduism
Buddhism
Other Religious
Myth and Legend
Paranormal Physical Identity Physical Appearance
Body
Health Perception Abstract/Concrete Continuum
Place, General
Place, Event
Place, Transportation
Place, Cosmos
Place, Noted
Color
Hearing
Touch
Taste
Smell
Time, General
Time, Historical
Time, Calendar Non-medical Drug Use Non-human Life
Animals
Plants
Micro Organisms Argot/vernacular Slang
Taboo
Offensive
Derogatory
Disgusting/Revolting
Euphemistic
Cliche In a preferred embodiment of the invention, the assignment of the fields and records as described above effectively links each traditional dictionary definition of each term in each context with more than 200 connotative and human interest variables. Specifically, a given record identifies a denotative context and part of speech for a given word or phrase. Also associated with such record are one or more emotional descriptors from one or more emotional categories. Further, many records also may have one or more associated human interest descriptors.

In addition, there are additional miscellaneous fields defined in some embodiments. One such field is to store a rating for the degree of power which the term has in the associated denotative context. Another miscellaneous field is to store a rating of the degree of activity associated with the term in the corresponding denotative context. Yet another miscellaneous field is to store a rating along a scale spanning from concrete to abstract.

User Interface 14

In a preferred embodiment a graphical user interface is implemented, which provides an end user with the capability of retrieving data from the data base 12. Although there are many ways in which a user interface may be implemented, in one embodiment a system with menus and windows is implemented.

Following is a description of a user interface for a connotative dictionary embodiment of the connotative language reference. Such user interface 14 is operated in either one of look-up mode or look-for mode. During 'look-up' mode a user enters a word or phrase and data is retrieved from the database 12 and displayed to the user. In 'look for' mode a user enters parameters into various filtering processes which are implemented to retrieve terms which correspond to criteria defined by the parameters.

Figure 3:
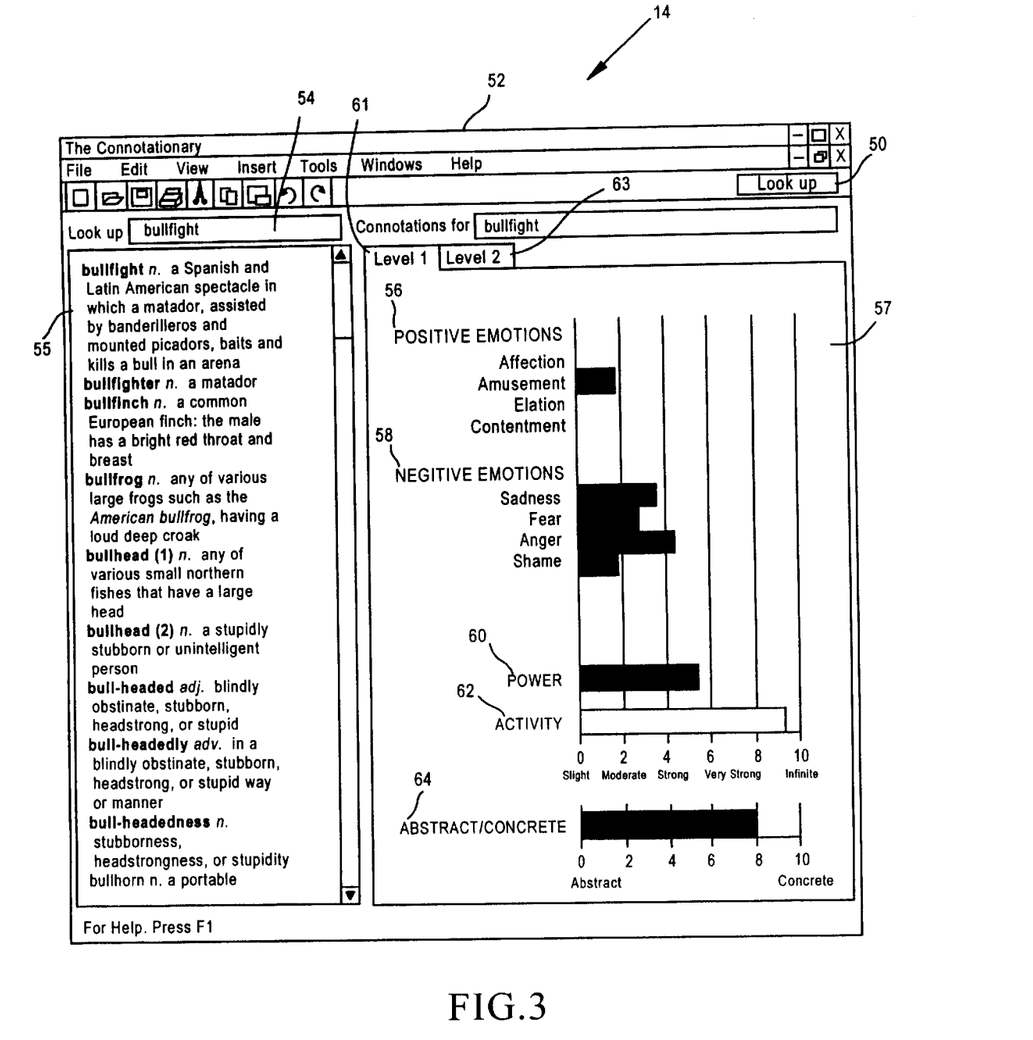
FIG. 3 is a display sample of a user interface in 'look up' mode according to an embodiment of this invention.

FIG. 3 shows an embodiment of the graphical user interface 14 in 'look up' mode. The mode is indicated on a button 50 in the upper right corner of the interface window 52. When in 'look up' mode, the user may type a word or phrase into a 'look up' box 54 in the upper left corner of the interface window 52. The connotative dictionary responds to the user's typed input by retrieving denotative information from the database 12 relating to the word or phrase that has been typed into the 'look up' box 54. This denotative information is displayed alphabetically in an area 55 (e.g., column) on the left-hand side of the user interface, and is formatted in much the same manner as the same denotative information is displayed and formatted in any conventional electronic dictionary.

Simultaneously, the dictionary 10 retrieves from the database 12 and displays on display 22 a range of connotative information relating to the same word or phrase that the user has typed in the 'look up' box 54. This connotative information is displayed in an area 57 on the right-hand side of the user interface window 52. Although specific formats and locations are being described the specific format and location of information within the window 52 may vary. In one embodiment the connotative information is displayed in a color-coded graphical format, including horizontal bars. Preferably, the relative lengths of the horizontal bars represent data corresponding to connotative intensity (strength or weakness). In one example, the colors designate the following:

| | |
|---|---|
| Green (56) | Positive emotional connotations |
| Red (58) | Negative emotional connotations |
| Grey (60) | Connotations of power |
| Yellow (62) | Connotations of activity |
| Olive (64) | Connotations of abstractness or concreteness |

A set of two tabs 61, 63, labeled "Level 1" and "Level 2," indicate the level of emotional classification and categorization of the connotative data represented in the graphical display area 57, 59 associated with the selected tab. In one embodiment these levels of classification and categorization are defined as follows:

Level 1: Four level 1 categories of "Positive Emotions" and four level 1 categories of "Negative Emotions" for the embodiment illustrated in FIG. 3.

Level 2: Each level 1 emotional category subsumes a list of 12 to 37 specific emotional descriptors (e.g., level 2 information), as listed in Table 2. Only the level 2 emotional descriptors associated with the word displayed in the 'Look up' box are displayed.

Figure 4:
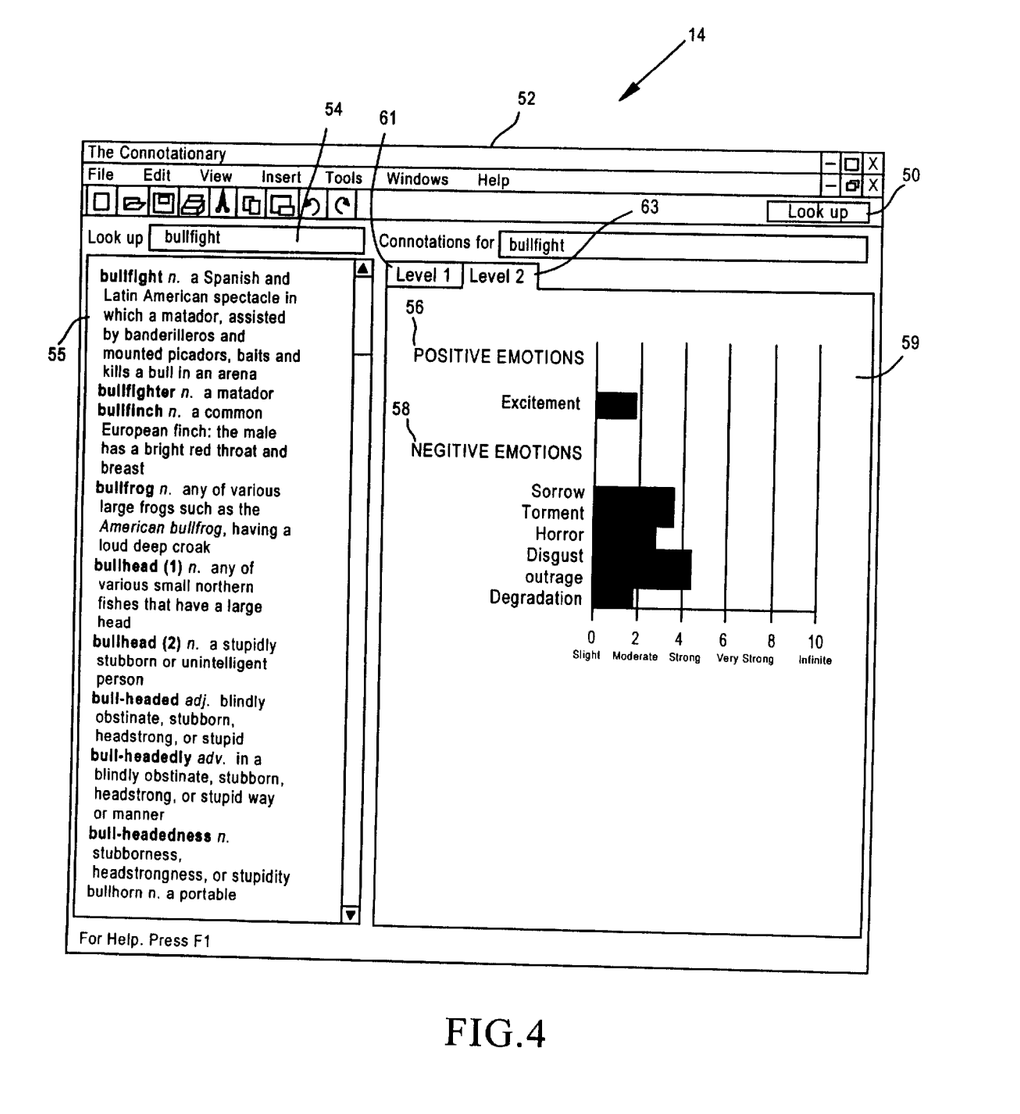
FIG. 4 is another display sample of the user interface in 'look up' mode according to an embodiment of this invention.

FIG. 4 shows the user interface 14 in 'look up' mode with the level 2 data being displayed in window area 59 for a selected term highlighted in window area 55. Such window area 59 overlays area 57 when tab 63 is selected.

Figure 5:
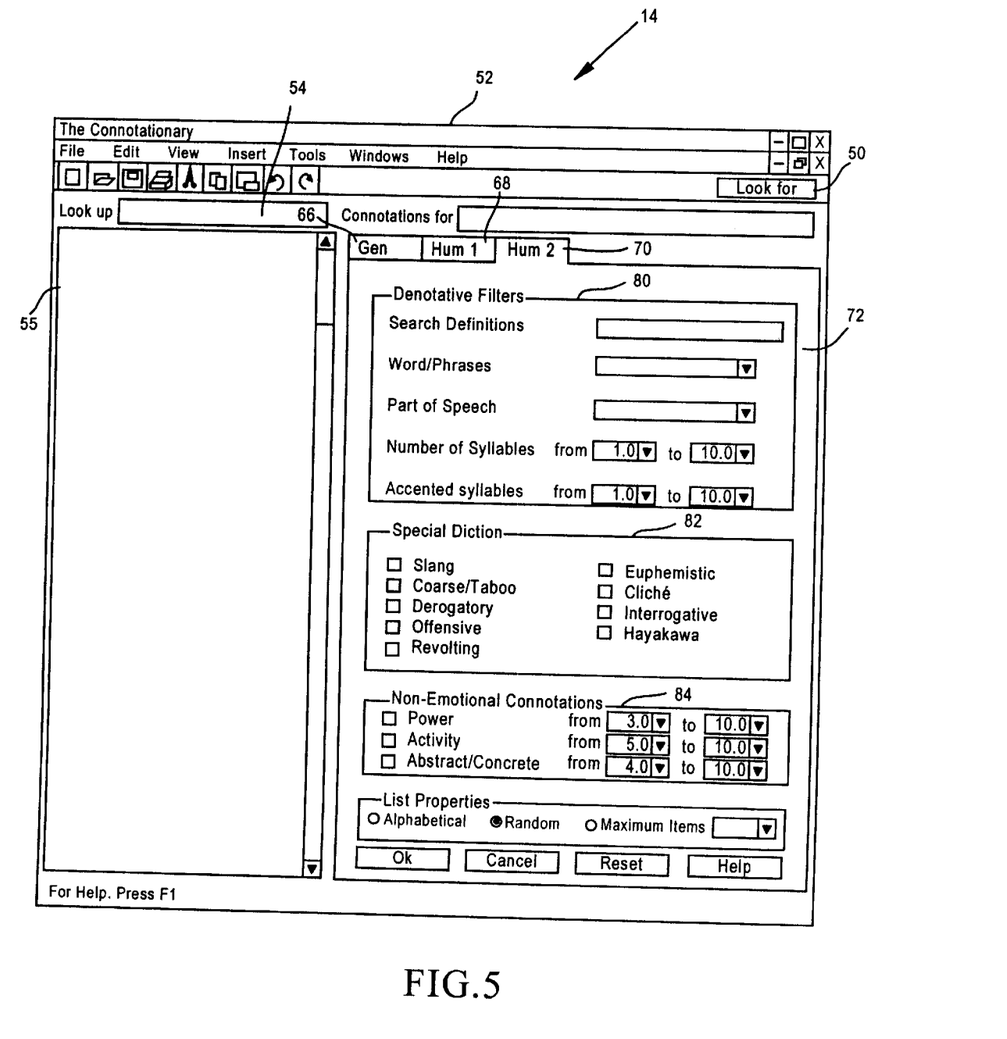
FIG. 5 is a display sample of a user interface in 'look for' mode according to an embodiment of this invention.
Figure 6:
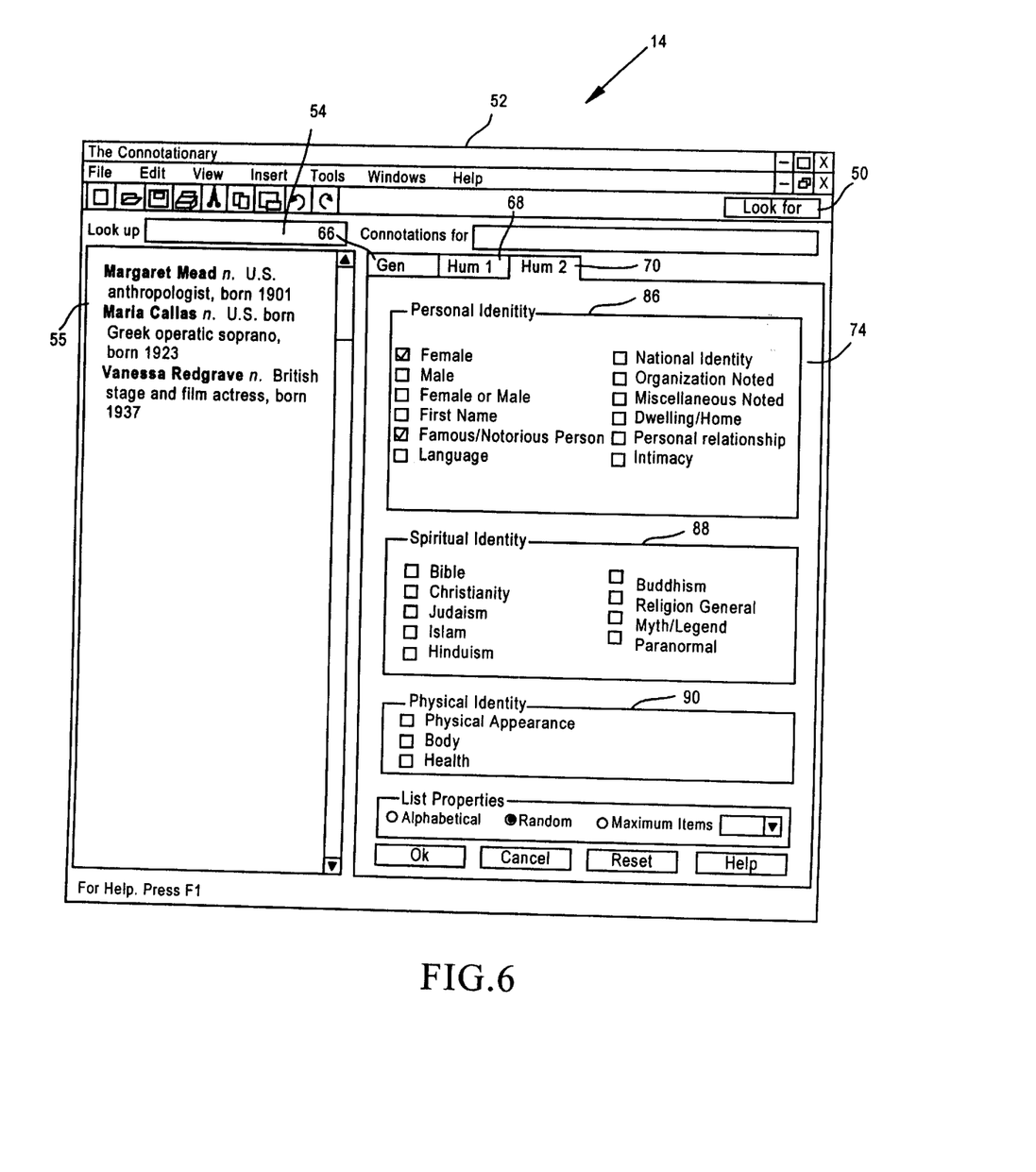
FIG. 6 is another display sample of a user interface in 'look for' mode according to an embodiment of this invention.
Figure 7:
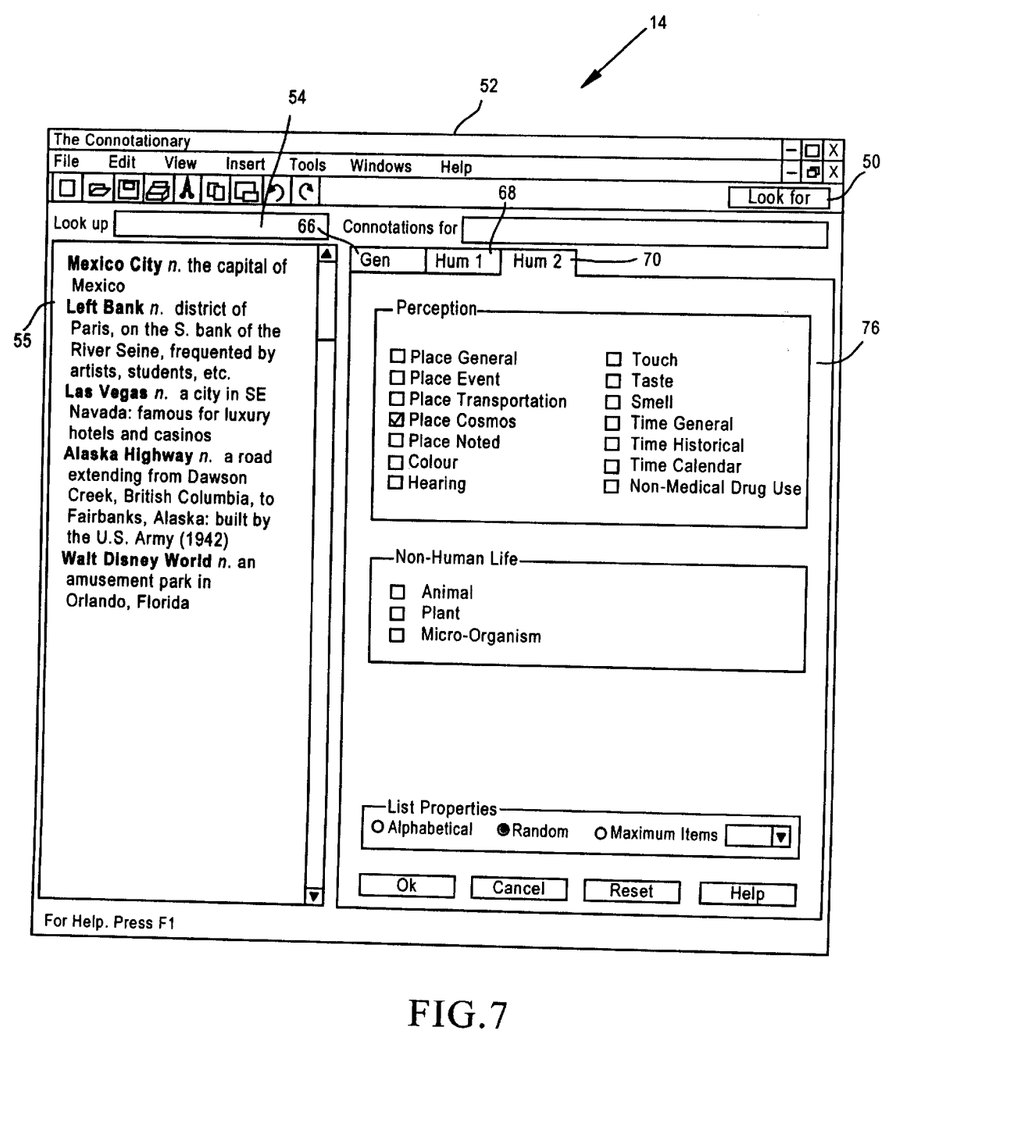
FIG. 7 is yet another display sample of a user interface in 'look for' mode according to an embodiment of this invention.

FIGS. 5–7 show the user interface 14 in 'look for' mode. The user enters 'look for' mode by toggling the 'Look up/Look for' toggle button 50. In a preferred embodiment of the invention, switching to 'Look for' mode changes the window 52 format to display a set of three tabs 66, 68, 70 with corresponding overlaying window areas 72, 74, 76. These tabs and window areas replace the tabs 61, 63 and window areas 57, 59 of the 'look up' mode.

In 'look for' mode the user may retrieve connotative content from the database 12. First, the user selects criteria from one or more human interest filters. Then the user initiates a search of the data base 12 for records matching the selected criteria. The human interest fields 48 employed in a preferred embodiment of the invention are listed in Table 3. These fields are displayed among the window areas 72, 74, 76 and are accessed by pressing on the corresponding tab 66, 68, or 70. The number of tabs 66, 68, 70 and the allocation of human interest fields 48 to the window areas 72, 74, 76 may vary.

In one embodiment the human interest fields associated with tab 66 are the special diction fields, the argot/vernacular fields and the non-emotional connotation fields of Table 3. In addition there are denotative filters 80 included in window area 72 for defining selection criteria. The user can search specific definitions, limit the words and phrases or parts of speech, limit the number of syllables or the accented syllable using the denotative filters 80. The user can select among slang, coarse, derogatory and other types of diction and vernacular under the heading of special diction filters 82. The non-emotional connotation filters 84 relate to scaled values based on a power quality, activity quality or abstract/concrete quality (i.e., the criteria relating to the miscellaneous fields described above).

Referring to FIG. 6, window area 74, which is selected by pressing on tab 68, includes personal identity filters 86, spiritual identity filters 88 and physical identity filters 90. In the example illustrated, the user has specified a filtered search of the database for a random selection of famous or notorious female persons. The language reference system 10 retrieves the requested information and displays it in the window on the left-hand side of the user interface once the user finalizes the choices by clicking on the button labeled 'OK.'

The user may select several human interest filters for a single search, in order to retrieve very particular customized lists of words and phrases. In a preferred embodiment of the invention, when the user has retrieved a customized list, the user may then switch back to 'look up' mode and retrieve all of the connotative information associated with any of the words and phrases in the customized list.

The human interest fields associated with the third tab in 'look for' mode are displayed in FIG. 7. In the example illustrated, the user has specified a filtered search of the database 12 for a random selection of noted places. The apparatus retrieves the requested information and displays it in the window on the left-hand side of the interface. Note that the user may switch among window areas 72, 74, and 76 to select desired criteria. Once all selection are made, the user clicks on the 'OK' button causing a search of the data base 12 for terms meeting the selected criteria.

System for Identifying Connotative Meaning

According to a preferred embodiment of the invention, the connotative meanings associated with the terms stored in the connotative language reference system 10 are derived by subjective responses from a plurality of evaluators. In a best mode embodiment the evaluators are a panel of persons having objective credentials or accepted expertise in connotative analysis. However, in some embodiments the evaluators may be selected at random. Such persons are referred to herein as connotative judges. In a preferred embodiment, the Internet is used as a recruitment medium to recruit 100 to 200 individuals who are not known to each other to act as independent connotative judges. In one embodiment, the connotative judges are screened for the following characteristics listed below in Table 4:

TABLE 4

Characteristics and Qualifications of Connotative Judges 1. 25% of all judges aged 40 or older and female
2. 25% of all judges under the age of 40 and female
3. 25% of all judges aged 40 or older and male
4. 25% of all judges under the age of 40 and male
5. All judges having at least 2 years of post-secondary education
6. All judges having an above-average vocabulary and command of whichever language is being used to practice the invention.
7. All judges having a substantial interest and some experience in the craft of writing, preferably creative writing.
8. Judges geographically dispersed over the area of interest for the language of interest.

While the above qualifications are used in one embodiment, the invention may be practiced using any number of judges having any qualifications of one's choosing. For example, connotative judges may be only women, or only men, or only individuals of a defined age or ethnic group, or only people who reside in a certain geographical location. The nature and quality of data captured will of course vary with the demographic profile of connotative judges, as well as with the number of judges used when practicing the invention, their geographical locations, and the linguistic qualifications of the judges.

The connotative judges evaluate the meaning of given words and phrases for connotative content using a questionnaire. The questionnaires preferably are distributed as database software files, although they may also be distributed in paper document form. The responses of the connotative judges are processed using either custom-designed database software or database software commercially available from manufacturers such as Inprise, Oracle, and Microsoft. As the data are analyzed, a database of connotative meaning is constructed, which is linked with each context of each word in the connotative dictionary. Each questionnaire is, in effect, a small database table containing three data fields, and preferably four data fields, as summarized in Table 5.

TABLE 5

Data Fields for Questionnaire Tables to Capture Connotative Data

Field 1  A field containing a term selected at random from the term field of the main database
Field 2  A field containing the denotative context for the term in Field 1
Field 3  A field containing the part of speech for the term in Field 1 (optional, but preferred)
Field 4  A blank field assigned for the connotative judge to record data identifying emotional connotations associated with the term and context in Fields 1, 2 and 3

In one embodiment, a distributed computing model is employed, in which the connotative judges use their own computers in their own homes or offices to receive questionnaire tables over the Internet (via e-mail or from a World Wide Web site) that are extracted from the main database 12. The connotative judges complete their work on the questionnaire tables, and then return the data tables over the Internet.

Figure 8:
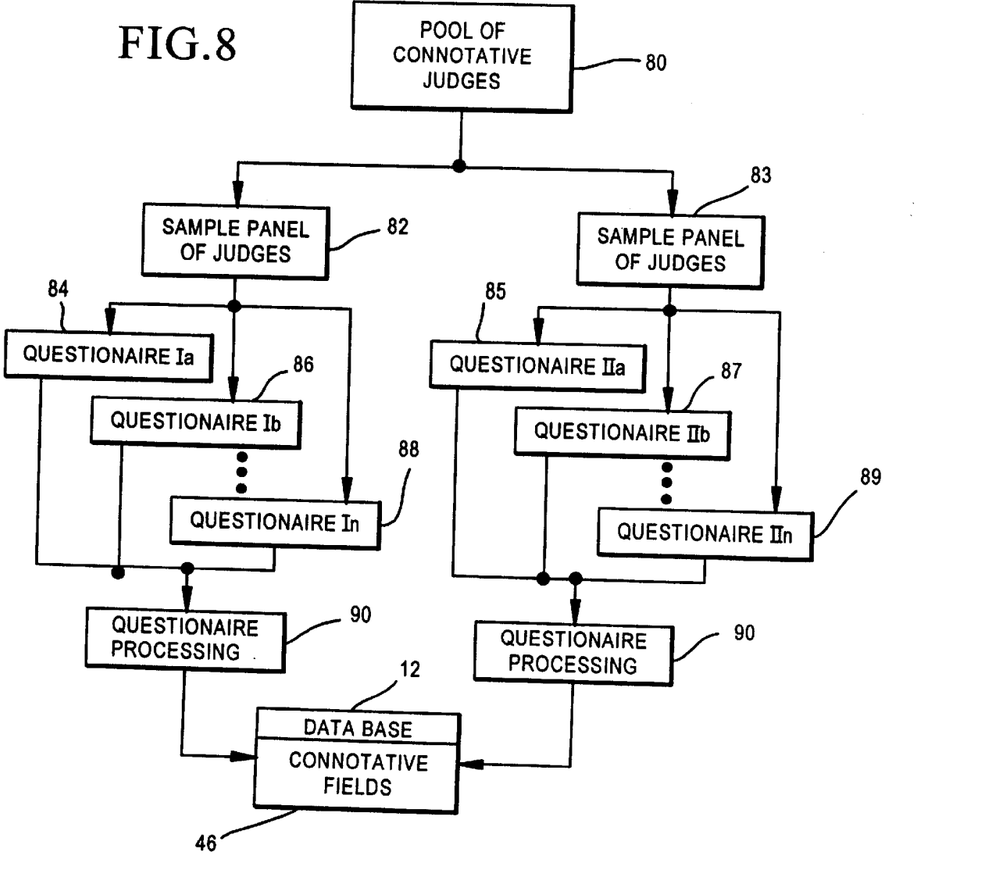
FIG. 8 is a diagram of a system for identifying connotative meanings according to an embodiment of this invention.

Referring to FIG. 8, a pool 80 of connotative judges are recruited to evaluate records of the connotative data base 12 for connotative associations of corresponding words and phrases. A sample of judges from the pool 80 forms a panel 82 used to evaluate a set of records. The same or different panels are formed to evaluate other sets of records. The number of records in a set may vary. For purposes of illustration a panel of 24 judges is described which evaluates a set of 500 records. In a preferred embodiment, each judge typically receives a questionnaire table 84 covering approximately 500 records, each record consisting of the four fields identified in Table 4. The questionnaire also includes instructions for selecting a code number to fill in the blank Field 4 for each record. Each connotative judge is also supplied with one or more of the eight category lists of code-numbered emotional descriptors identified in Table 2. In a preferred embodiment for a given questionnaire each judge is supplied with only one of the eight category lists of emotional descriptors found in Table 2. Thus, in a given questionnaire a judge evaluates the terms for connotative meaning in only a specific emotional category. To complete the questionnaire table, the connotative judge inputs one of three codes or code types for each record in Field 4, as listed in Table 6.

TABLE 6

Coding Alternatives for Capturing SET 2 Connotative Data

1. Code the two-digit number (see Table 2 above) associated with one and only one emotional descriptor that most closely matches the emotional connotation that the connotative judge associates with the term in Field 1, considering the denotative context and part of speech in Fields 2 and 3.
2. Code "00" if the connotative judge understands the term and its denotative context, but does not associate any of the emotional descriptors from the supplied list of emotional descriptors with the term and its denotative context.
3. Code "99" if the connotative judge does not know the term, or the specific associated denotative context.

In a preferred method of practicing the invention, only one judgment is required for each record in a questionnaire table. However, in other embodiments more than one judgment may be allowed or required, if, for example, one wishes to capture the connotative judge's first choice and also the connotative judge's second choice of emotional descriptor. To effect such data capture, the number of connotative fields 46 (see FIG. 2) would need to be expanded accordingly, and the questionnaire table structure modified to include additional data capture fields.

The connotative judge repeats this procedure for all 500 records in the questionnaire, then returns the completed questionnaire table 84 via the Internet. Thereafter, the judge may receive another questionnaire table 86, or 88 to evaluate. The next questionnaire table received by the connotative judge may contain exactly the same set of records that was just evaluated, but accompanied by a different category list of emotional descriptors to be used for coding. Alternatively, the next questionnaire table may contain a completely different selection of records. The exchange of questionnaire tables continues iteratively for the duration of connotative data collection.

In a preferred embodiment of the invention, each block of 500 records is evaluated in this manner eight times (corresponding to the eight category lists of connotative descriptors listed in Table 2), each time by 24 different connotative judges selected at random from the pool of 100 to 200 available connotative judges, using a judge-selection technique that stratifies sampling to ensure equal representation according to the guidelines summarized in Table 4. Note that the number of judges selected, the size of the pool and the number of records processed in a given questionnaire may vary.

Typically a plurality of panels 82, 83 are formed to evaluate the database 12 records for connotative associations. Different panels 82, 83 receive either the same or different questionnaires 84–89. For the exemplary embodiment where 24 judges evaluate each of 500 records in a given questionnaire, the same 24 judges may or may not evaluate all eight categories of emotional connotations for such 500 records.

Comparatively analyzing the connotative data associated with each block of records being processed serves to check for data integrity. Checking the data for integrity is part of an automated questionnaire processing function 90 (see FIG. 8). An initial integrity processing step is to determine whether any of the 24 sets of data should be rejected as invalid because of anomalous data. This is accomplished by statistically comparing the score set of each individual judge with the combined score sets of the other 23 judges who evaluated the same set of words using the same lists of emotional descriptors. If the scores between any given judge's data and the aggregate data of the other judges in the panel are not statistically related, then the data set for the anomalous judge is rejected. Anomalous data may arise if, for example, a connotative judge is filling in random data to avoid the mental work involved in providing genuine connotative data, or if a judge is coding a large number of double zeros and ninety-nines, or if a judge's experience is so far out of the mainstream that his or her connotative associations are not representative of the larger population. In a preferred method of practicing the invention, a minimum correlation level of 0.6 is used as a data rejection threshold.

Further analysis includes determining how many valid non-zero scores remain after purging invalid scores and after accounting for 00 and 99 scores. A determination is then made to ascertain which emotional connotations the judges most often associate with each word or phrase. This is a function of four factors:

1. The number of valid scores remaining after data purging;
2. The number of emotional connotative descriptors in the list the judges had to choose from;
3. The number of judges who selected the same emotional descriptor; and
4. The probability that the same emotional descriptor was selected by more than one judge merely by chance.

The multinomial probability distribution below in equation (1) embodies the above factors:

$$P(y) = \frac{n!}{y!(n-y)!} * p^y q^{n-y} \quad (I)$$

where:
n is the total number of independent connotative judges evaluating the record;
y is the number of judges selecting a particular emotional descriptor;
p is the probability of the emotional descriptor being selected if the selection occurs by chance;
q is the probability of an emotional descriptor being excluded if the selection occurs by chance; and
P(y) is the probability of the emotional descriptor being selected by y judges if the selections occurred by chance.

Tables may be constructed of the probabilities P(y) of connotative judges independently selecting the same emotional descriptors by chance for various panel sizes (e.g., increasing incrementally up to 24, and/or additional panel sizes of 36, 72, 96, and 120 or any other panel size), and emotional connotative descriptors available for selection (e.g., increasing incrementally up to 24, with additional category group sizes of 36, 72, 96, and 120, or any other corresponding descriptor group size).

As an example, consider the following set of connotative judgments for one word evaluated by 24 connotative judges on the Amusement/Excitement emotional category, which subsumes 16 emotional descriptors. The total number of valid judgments after purging is 21 (Table 7).

TABLE 7

Example of Field 4 Questionnaire Table Scores

| Emotional Descriptors | Field 4 "Votes" Received from Connotative Judges |
|---|---|
| Amazement | 0 |
| Amusement | 3 |
| Astonishment | 0 |
| Eagerness | 2 |
| Enthusiasm | 0 |
| Excitement | 1 |
| Exhilaration | 1 |
| Exuberance | 1 |
| Fun | 0 |
| Glee | 5 |
| Hilarity | 3 |
| Merriment | 1 |
| Mirth | 3 |
| Surprise | 0 |
| Thrill | 1 |
| Wonder | 0 |

The associated probabilities of chance selection of the same emotional descriptor by independent connotative judges, according to equation (I), are as follows:

| Number of Judges Selecting the Same Category | Probability of Chance Selection |
|---|---|
| 0 | 0.258 |
| 1 | 0.361 |
| 2 | 0.241 |
| 3 | 0.102 |
| 4 | 0.030 |
| 5 | 0.007 |

In this example, only one emotional descriptor, "Glee," has been selected by enough independent connotative judges (5 judges) to meet the test of statistical significance, and is retained in the main database 12 as a connotative association for the term being evaluated. For any given term selection of emotional descriptors from one emotional category does not preclude selection of emotional descriptors from other emotional categories. Any given term is apt to evoke several kinds of emotional response simultaneously. Therefore, the same term is also evaluated in an identical manner on the other seven categories of emotional connotations listed in Table 2. Thus, the term may, or may not, finish with more connotative emotional descriptors added when the data collection procedure has been completed.

In a preferred embodiment of the invention, terms that receive no votes from the connotative judges on any of the connotative groupings, or too few votes on all eight connotative groupings to meet the test of statistical significance, are tagged as "non-connotative," so that such words may be optionally excluded from further analysis or database querying.

The Human Interest fields 48 may be defined in the same manner. However, because the human interest fields are less subjective and relate more directly to denotative context, in a preferred embodiment assigned editors are used to define most of the human interest fields. However, several variables on the Table 3 list of human interest fields, such as the miscellaneous fields for "Abstract-Concrete," "Power," and "Activity" are better left to evaluation by panels of connotative judges.

A preferred embodiment of the invention such as the one described herein is both human-judgment based and dynamic, reflecting the human and dynamic nature of language. Since the data provided by the connotative judges are key to the system and method, one may wish to establish a program of continuous update of the database, either at prescribed intervals or on an ongoing basis, such as through a World Wide Web site. In this way, connotative judges would be able to supply data continuously, with turnover of connotative judges easily managed, and the database, particularly the connotative component, kept completely up to date allowing for new or changing connotative associations.

In one embodiment participating judges periodically or a periodically receive a mini-database via e-mail or by logging onto a web site. The mini-database serves as the questionnaire allowing the judge to enter a code for the connotative association (see table 6) for a given emotional category (see table 2). The results are then processed as described above for data integrity (see questionnaire processing 90 of FIG. 8 and related description).

By practicing the above method and system of the present invention, a complete and accurate connotative language reference database 12 is constructed in any language, which then can be used to construct interactive connotative language reference tools, such as connotative dictionaries, connotative thesauruses, and connotative text analysis tools.

Meritorious and Advantageous Effects

One advantage of the system for identifying connotative meanings is that reliable associations are identified for given words and phrases in each of their denotative contexts. Another advantage is that the associations are maintained over time accounting for changes in the vernacular or other changes/occurrences over time which affect connotative association.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method for identifying connotative meaning of a plurality of data records, each record corresponding to a term and a specific denotative context for said term, the method comprising the steps of:

evaluating, multiple times, each one record of the plurality of records for a connotative association with each one of a plurality of predefined emotional descriptors within each one of a plurality of predefined emotional categories to achieve multiple samples of connotative association data for said each one record;

identifying any statistically significant connotative associations for each one record of the plurality of records based upon said multiple samples of connotative association data, wherein the identified statistically significant connotative associations are said identified connotative meanings.

2. The method of claim 1, wherein there are no connotative meanings identified during the identifying step for at least one of the plurality of records.

3. The method of claim 1, in which the step of evaluating comprises the steps of:

displaying said one record of the plurality of records at a first display device;

selecting either one of no connotative association or a primary connotative association for the displayed record from a predefined set of emotional descriptors within a first emotional category of said plurality of emotional categories;

repeating the steps of displaying and selecting for other records among the plurality of records.

4. The method of claim 3, in which the step of evaluating further comprises the steps of:

displaying said one record of the plurality of records at a second display device;

selecting either one of no connotative association or a primary connotative association for the displayed record from a predefined set of emotional descriptors within a second emotional category of said plurality of emotional categories;

repeating the steps of displaying and selecting for additional records among the plurality of records.

5. The method of claim 4, wherein the first display device and second display device are the same display device.

6. The method of claim 1, wherein the step of evaluating comprises the steps of:

selecting a first plurality of connotative judges to evaluate a first set of records among said plurality of records for a connotative association with a plurality of emotional descriptors from a first category of the plurality of emotional categories to achieve a sample of connotative association data for said first category for each record among said first set of records; and selecting a second plurality of connotative judges to evaluate a second set of records among said plurality of records for a connotative association with a plurality of emotional descriptors from a second category of the plurality of emotional categories to achieve a sample of connotative association data for said second category for each record among said second set of records.

7. The method of claim 6, wherein the first plurality of connotative judges is the same as the second plurality of connotative judges, wherein said first set of records is the same as said second set of records, and wherein said first emotional category is different from said second emotional category.

8. The method of claim 6, wherein the first plurality of connotative judges is the same as the second plurality of connotative judges, wherein said first set of records is different from said second set of records, and wherein said first emotional category is the same as said second emotional category.

9. A method for identifying connotative meaning of a plurality of data records, each record respectively corresponding to a term and a corresponding denotative context for said term, the method comprising the steps of:

evaluating, multiple times, each one record of the plurality of records for a connotative association to each one of a plurality of predefined emotional descriptors to achieve multiple samples of connotative association data for said each one record;

identifying any statistically significant connotative associations for each one record of the plurality of records based upon said multiple samples of connotative association data, wherein the identified statistically significant connotative associations are said identified connotative meanings.

10. The method of claim 9, wherein the step of evaluating comprises the steps of:

selecting a first plurality of connotative judges to evaluate a first set of records among said plurality of records for a connotative association with a plurality of predefined first emotional descriptors to achieve a first sample of connotative association data for each record among said first set of records; and selecting a second plurality of connotative judges to evaluate the first set of records among said plurality of records for a connotative association with a plurality of predefined second emotional descriptors to achieve a second sample of connotative association data for each record among said second set of records.

11. The method of claim 10, in which the first plurality of connotative judges is the same as the second plurality of connotative judges.

12. The method of claim 9, wherein the step of evaluating comprises the steps of:

selecting a plurality of connotative judges, in which the connotatively judges cumulatively evaluate the plurality of records for a connotative association to each one of a plurality of predefined emotional descriptors to achieve multiple samples of connotative association data for said each record of said plurality of records.

13. The method of claim 12, in which said plurality of predefined emotional descriptors are organized into a plurality of mutually exclusive categories; and in which no more than two emotional descriptors are selected to be associated with any given record by a given judge among the plurality of connotative judges from a given one of said categories.

14. A method for identifying connotative meaning of a plurality of data records, each record corresponding to a term and a specific denotative context for said term, the method comprising the steps of:

selecting a first plurality of connotative judges to receive a first plurality of questionnaires, each one questionnaire among the first plurality of questionnaires including a first set of records from the plurality of records and a set of emotional descriptors;

selecting a second plurality of connotative judges to receive a second plurality of questionnaires, each one questionnaire among the second plurality of questionnaires including a second set of records from the plurality of records and a set of emotional descriptors;

for a first questionnaire of said first plurality of questionnaires, in which the set of emotional descriptors is associated with a first emotional category, displaying one record of the first set of records at a first display device accessible to one of the first plurality of connotative judges, selecting either one of no connotative association or a primary connotative association for the displayed record from said first emotional category of emotional descriptors, and repeating the steps of displaying and selecting for other records among the first set of records;

for a second questionnaire of said first plurality of questionnaires, in which the set of emotional descriptors is associated with a second emotional category, displaying one record of the first set of records at the first display device, selecting either one of no connotative association or a primary connotative association for the displayed record from said second emotional category of emotional descriptors, and repeating the steps of displaying and selecting for the second questionnaire for the other records among the first set of records.

15. The method of claim 14, in which said first plurality of judges evaluates each record among the first set of records for connotative association to emotional descriptors among different emotional categories in each one of the first plurality of questionnaires.

16. A method for identifying connotative meaning of a plurality of data records, each record corresponding to either one of a specific word or phrase and a specific denotative context for said one specific word or phrase, the method comprising the steps of:

displaying one record of the plurality of records;

selecting a connotative association for the displayed record from a predefined set of emotional descriptors within a given emotional category;

repeating the steps of displaying and selecting for other records among the plurality of records.

17. The method of claim 16, further comprising the step of:

selecting a plurality of connotative judges, in which the connotative judges cumulatively evaluate the plurality of records for a connotative association to each one of a plurality of predefined emotional descriptors to achieve multiple samples of connotative association data for said each record of said plurality of records.

18. The method of claim 17, further comprising the step of:

identifying any statistically significant connotative associations for each one record of the plurality of records based upon said multiple samples of connotative association data, wherein the identified statistically significant connotative associations are said identified connotative meanings.

19. A system for identifying connotative meaning of a plurality of data records, each record corresponding to either one of a specific word or phrase and a specific denotative context for said one specific word or phrase, the system comprising:

means for gathering multiple samples of connotative association data for each one record of said plurality of records, said gathering means comprising a list emotional descriptors;

means for identifying any statistically significant connotative associations for each one record of the plurality of records based upon said multiple samples of connotative association data, wherein the identified statistically significant connotative associations are said identified connotative meanings.

20. The system of claim 19, in which said gathering means comprises a plurality of questionnaires, each one questionnaire encompassing a set of records from said plurality of records and allowing selection of no more than two emotional descriptors for any given record of said set of records.

21. The system of claim 20, wherein each one questionnaire includes emotional descriptors from within not more than one emotional category.

22. The system of claim 20, in which the gathering means comprises:

a display at which a given questionnaires is displayed; and an input device for receiving a selection of either one of no connotative association or a primary connotative association for a displayed record from said list of emotional descriptors.

23. The system of claim 20, in which the gathering means further comprises means for routing a first questionnaire among the plurality of questionnaires to a computer of a screened connotative judge.

* * * * *